April 25, 1967     H. RIEPE     3,315,644
PEN NIB

Filed Dec. 20, 1965     2 Sheets-Sheet 1

INVENTOR.
HELMUTH RIEPE

BY *Percy Freeman*

ATTORNEY

April 25, 1967   H. RIEPE   3,315,644
PEN NIB

Filed Dec. 20, 1965   2 Sheets-Sheet 2

INVENTOR.
HELMUTH RIEPE
BY
*Percy Freeman*
ATTORNEY

United States Patent Office 3,315,644
Patented Apr. 25, 1967

3,315,644
PEN NIB
Helmuth Riepe, Hamburg, Germany, assignor, by mesne assignments, to Rapidograph, Inc., Bloomsbury, N.J., a corporation of New Jersey
Filed Dec. 20, 1965, Ser. No. 515,013
Claims priority, application Germany, Dec. 24, 1964, R 39,540
4 Claims. (Cl. 120—44)

The present invention relates to writing instruments.

In particular, the present invention relates to pens of the type used in drawing.

It is conventional with pens of this latter type to provide a tubular nib which is removably connected with a suitable holder, as by being threaded into the latter, for example. Such a nib is provided at its exterior with an aeration canal or groove which may have the form of a helix, for example. This aeration groove is formed at the exterior of a tubular body of the nib which accommodates in its interior a weight which is capable of falling freely in the interior of the tubular body and which is fixed at one end to an elongated capillary wire which is slidable in a tubular fitting which is carried by the tubular body and which projects beyond one end thereof, the opposite end of this tubular body being open so that the weight is freely movable through this opposite open end of the tubular body, together with the capillary wire. This capillary wire of course controls the flow of ink or other marking liquid to the tip of the nib, and in addition it will avoid plugging of the nib. The shifting of the capillary wire in the tubular fitting will prevent such plugging from taking place.

One of the primary disadvantages encountered with pen nibs of this latter type is that when they are removed from the pen holder, the weight can easily fall out of the tubular body of the pen nib, resulting in bending of the fine capillary wire from its position where it extends precisely along the axis of the nib. It is then only possible with difficulty, or not at all, to restore the capillary wire to its initial position. It is only possible to avoid falling of the weight out of the tubular body of the nib when the holder is positioned with its point directed downwardly, but in this latter position the writing liquid or ink can easily drop out. Moreover, the weight is quite frequently removed intentionally by the user under the assumption that such removal is required for cleaning purposes, and in this case also the capillary wire becomes easily bent.

It is, therefore, a primary object of the present invention to provide a structure which will avoid the above disadvantages.

In particular, it is an object of the invention to provide a guard means which can readily be connected with the tubular body of the nib for guarding against falling of the weight from the latter.

Yet another object of the invention is to provide a structure which will enhance the communication between an aeration groove at the exterior of the tubular body and the interior of the tubular body.

It is also an object of the invention to provide a tubular body with a construction which enables it to be very conveniently inserted into and removed from a holder by application of a suitable tool to the body.

At the present time the tubular fittings of conventional nibs are easily broken during removal of the nib from the holder, and it is therefore among the objects of the invention to provide an arrangement which will enable removal and replacement of the nib without the danger of breaking the tubular fitting.

Still another object of the invention is to provide for a pen nib of the above type a guard means which while reliably guarding against falling of the weight out of the tubular body nevertheless can be conveniently manipulated by the operator so as to assume a position permitting intentional removal of the weight from the tubular body of the pen nib.

In particular, it is an object of the invention to provide a structure of this latter type which while permitting convenient removal of the weight from the interior of the tubular body nevertheless protects the guard means itself against any permanent deformation or other injury during manipulation in connection with removal and replacement of the weight.

Thus, the structure of the present invention includes a pen nib which is adapted to be removably connected with a suitable pen holder and which includes an elongated tubular body which is open at one end and which has an opposed end provided with an end wall formed with an axial bore passing therethrough. An elongated tubular fitting is carried by the end wall in the bore thereof and provides communication between the interior and the exterior of the tubular body, and an elongated capillary wire is axially slidable in the tubular fitting and has an inner end situated in the interior of the tubular body. A weight is situated in the interior of the tubular body and is freely movable along the axis thereof, and this weight is fixed to the end of the capillary wire which is situated in the interior of the tubular body. In accordance with the invention a tubular body carries at its open end a guard means which guards against falling of the weight out of the tubular body, and this guard means preferably has a U-shaped configuration providing it with a pair of opposed side arms which are connected to the tubular body and project beyond the latter at its open end, these side arms being interconnected by a transverse arm which extends across that end of the weight which is directed away from the end wall of the tubular body so as to engage the latter end of the weight when it tends to fall out of the tubular body and thus prevent falling of the weight from the tubular body.

The invention is illustrated by way of example in the accompanying drawings which form part of the application and in which.

Figure 1:
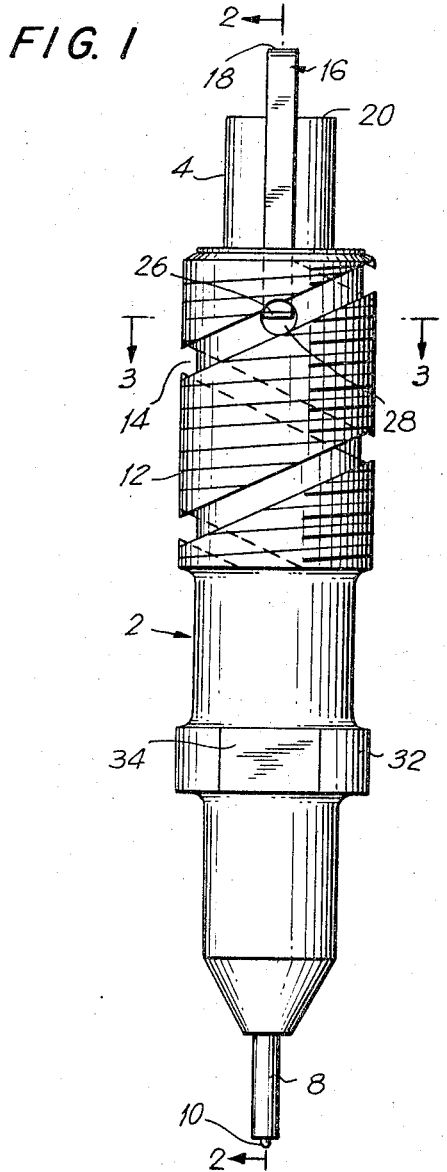
FIG. 1 is a side elevation of one possible construction of a pen nib according to the present invention.

Referring now to the drawings and to FIGS. 1–4 in particular, it will be seen that the pen nib of the present invention includes an elongated tubular body 2 of substantially cylindrical configuration which may be made of any suitable metal. This body 2 has an upper open end, as viewed in FIGS. 1 and 2, and an opposed lower end where the hollow tubular cylindrical body 2 is provided with an end wall, and is particularly apparent from FIG. 2. This end wall is formed with an axial bore passing therethrough, and an elongated tubular fitting 8 is fixedly carried by the body 2 in the bore of its lower end wall, so that it is through the tubular fitting 8 that the interior if the tubular body can have communication with the exterior thereof through the bottom end wall of the tubular body 2.

An elongated capillary wire 10 extends along the interior of the tubular fitting 8 and is freely movable therein, and this capillary wire 10 has an inner end situated in the interior 6 of the tubular body 2 where this inner end of the capillary wire 10 is fixed directly to an elongated weight 4 which is freely movable in the interior 6 of the tubular body 2 along the axis of the latter.

At the region of its upper open end the tubular body 2 is provided at its exterior with threads 12 which enable the nib to be threaded into and removed from a suitable pen holder, and these threads 12 provide a relatively tight fit of the nib in the pen holder. Also, at the region of its upper open end the tubular body 2 is formed at its exterior with an elongated aeration groove 14 which extends along the helix all the way up to the upper end of the tubular body 2, as viewed in FIGS. 1 and 2.

In accordance with the present invention, the tubular body 2 is provided at the region of its open end with a guard means 16 which guards against falling of the weight 4 out of the tubular body 2. This guard means 16 is preferably made of metal and has a U-shaped configuration, as is clearly apparent from FIG. 2. The guard means of the invention, while it reliably prevents falling of the weight out of the body, nevertheless permits manual movement of the weight, without removal thereof from the tubular body 2, for cleaning purposes. The U-shaped guard means 16 has a transverse arm 18 extending between and connected to a pair of opposed side arms 22 and 24 which extend from its transverse arm 18 to the tubular body to which the side arms are fixed in a manner described below. The transverse arm 18 extends across an end 20 of the weight 4 so as to be situated in the path of the movement of the end 20 when the weight 4 tends to fall out of the body, and since the distance between the open end of the body 2 and the arm 18 is substantially less than the length of the weight 4, the latter is reliably prevented from falling out of the tubular body 2.

At their free ends which are distant from the transverse arm 18, the side arms 22 and 24 are respectively provided with outwardly directed end portions 26 which extend radially with respect to the axis of the tubular body 2. The tubular body 2 is formed with a pair of opposed openings 28 which respectively receive the end portions 26, so that in this way the guard means 16 is removably connected with the tubular body 2. Because of the springy nature of the guard means 16 the side arms 22 and 24 thereof tend to move apart from each other to maintain the end portions 26 respectively in the openings 28. Preferably at least one of the openings 28 is situated in communication with the aeration groove 14, so as to provide a further communication between the groove 14 and the interior of the tubular body.

Figure 2:
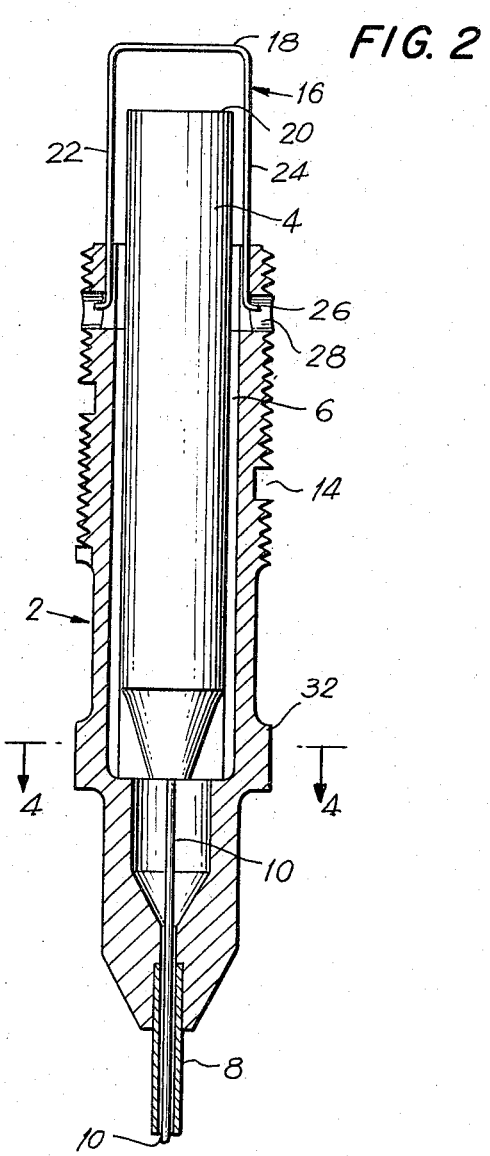
FIG. 2 is a longitudinal section of the nib of FIG. 1 taken along line 2—2 of FIG. 1 in the direction of the arrows.
Figure 3:
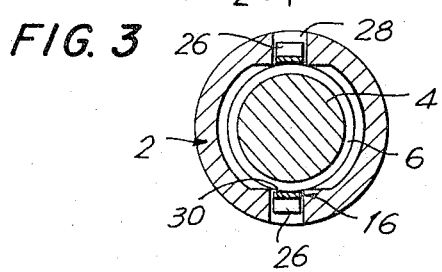
FIG. 3 is a sectional plan view of the structure of FIG. 1 taken along line 3—3 of FIG. 1 in the direction of the arrows.
Figure 4:
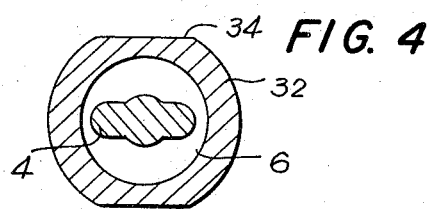
FIG. 4 is a sectional plan view of the structure of FIG. 2 taken along line 4—4 of FIG. 2 in the direction of the arrows.

With the embodiment of FIGS. 1–3 the guard means 16 is prevented from turning from its position indicated in FIG. 1, and for this purpose the tubular body 2 is formed at its interior with a pair of axially extending grooves 30 which extend from the upper open end of the tubular body 2 up to the openings 28 thereof and which are wide enough to receive the side arms 22 and 24 of the guard means 16. Thus, with this construction the guard means 16 will be reliably maintained in the position where its transverse arm 18 extends across the end 20 of the weight 4 in order to prevent falling of the latter out of the tubular body 2.

In addition, the tubular body 2 is provided at the region of its lower end wall with a collar 32 provided with a pair of opposed flat surface portions 34 capable of being acted upon by a suitable wrench, key, or the like, so that the tubular body 2 can be conveniently screwed into or out of a pen holder. Beneath the collar 32 the tubular body 2 has a tapered configuration where it diminishes in cross section and is of a substantially frustoconical configuration, as is clearly apparent from FIGS. 1 and 2. With this latter construction in the region of the lower end of the nib of the invention when a tool is applied to the flats 34 of the collar 32 for the purpose of introducing or removing the nib from a pen holder, there is almost no possibility of breaking the tubular fitting 8.

With the structure described above, if it should be desired intentionally to remove the weight 4, the operator can always press the arms 22 and 24 against each other so as to be able to withdraw the guard means from the body 2 so as to permit intentional removal of the weight 4 together with the capillary wire 10. However, this manipulation of the guard means 16 sometimes results in permanent deformation thereof and furthermore gives rise to certain inconveniences in removing and replacing the guard means 16. Therefore, where intentional removal of the weight 4 is contemplated, a construction as shown in FIGS. 5 and 6 is preferred.

Figure 5:
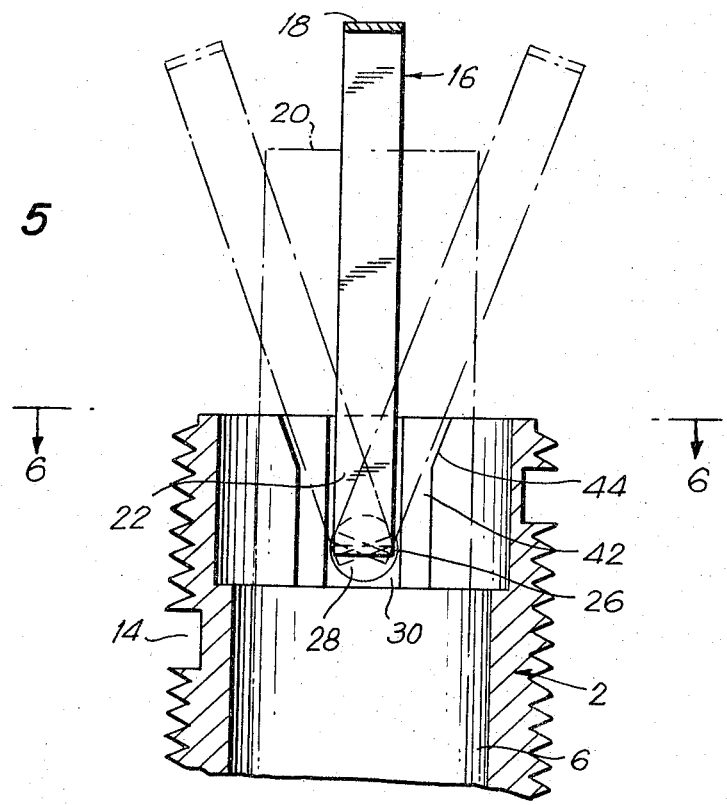
FIG. 5 is a fragmentary sectional elevation showing another embodiment of a guard means according to the invention, FIG. 5 being taken along line 5—5 of FIG. 6 in the direction of the arrows.
Figure 6:
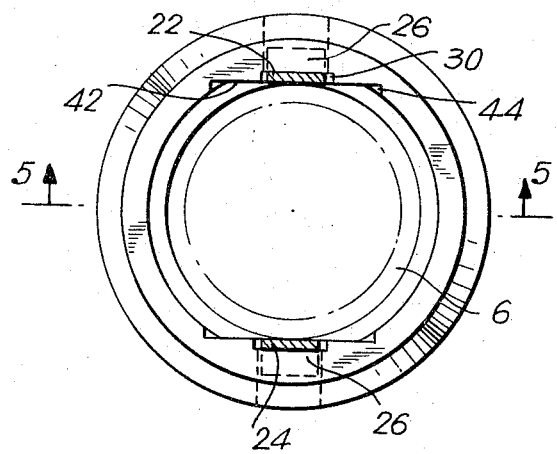
FIG. 6 is a sectional plan view of the structure of FIG. 5 taken along line 6—6 of FIG. 5 in the direction of the arrows.

Referring now to FIGS. 5 and 6 it will be seen that the lower portions of the side arms of the guide means 16 are still situated in grooves 30 which are formed at the inner surface of the tubular body 2, as described above. However, in this case the grooves 30 have wider portions 42 which are substantially wider than the arms 22 and 24, and in addition these wider portions 42 of the grooves 30 are widened so as to flare outwardly at their regions situated next to the upper open end of the tubular body 2. In this way the grooves 30 have not only the wider portions 42 but also the tapering portions 44 which enable the guard means 16 to be turned from the solid line position of FIG. 5 into either of the dot-dash line positions illustrated in FIG. 5. The flaring or tapering portions 44 are of substantially V-shaped configuration while the lower wider portions 42 extend parallel to the grooves 30 so as to form lateral extensions thereof. Thus, the limits of the wider portions 44 will provide stop edges limiting the extent of turning of the guard means 16 in the manner indicated in FIG. 5. When the guard means 16 is tilted to one or the other of the limiting edges of the wider flaring groove portions 44, the transverse arm 18 is out of the path of movement of the end 20 of the body 4 so that the latter can be freely removed and replaced. With the particular arrangement shown in FIGS. 5 and 6 where the grooves 30 have inner portions somewhat deeper that their widened portions 42, it is possible for the side arms of the guard means 16 to be situated in these deeper portions in the manner which will prevent free tilting of the guard means so that it will remain in the position indicated in FIG. 1 and in solid lines in FIG. 5. Thus, the guard means will not normally be turnable away from its operating position preventing falling of the weight out of the tubular body. However, after only a slight pressing of the side arms toward each other they will be freely movable in the widened portions 42 of the groove to the tilted positions indicated in FIG. 5 in dot-dash lines enabling removal of the weight, cleaning or replacing of the same, without any difficulty, so that with this construction the guard means need not be removed entirely from the hollow cylindrical body 2.

What is claimed is:

1. A pen nib adapted to be removably mounted in a pen holder and comprising an elongated tubular body having an open end and an opposed end provided with an end wall formed with an axial bore through which the interior of said body can communicate with the exterior, an elongated tubular fitting carried by said body in said bore of said end wall thereof, an elongated capillary wire slidable in said tubular fitting and extending therefrom into the interior of said tubular body, an elongated weight situated in said tubular body and freely movable therein along the axis thereof, said weight being fixedly connected with said capillary wire so that the latter moves with said weight, and guard means carried by said tubular body at said open end thereof for guarding against falling of said weight out of said tubular body, said guard means being of a U-shaped configuration and having a pair of opposed side arms respectively connected to and extending beyond said body at said open end thereof and a transverse arm distant from said open end of said body and extending between and connected to said side arms, said transverse arm extending across an end of said weight which is directed away from said end wall of said tubular body, said side arms terminating a distance from said transverse arm in a pair of outwardly directed end portions, said tubular body being formed with openings respectively receiving said end portions of said side arms, said tubular body being formed in its interior with a pair of opposed axially extending grooves extending from said open end of said tubular body to said openings thereof and receiving said opposed side arms.

2. A pen nib as recited in claim 1 and wherein said grooves are wider than said side arms to provide for limited turning movement thereof with respect to said tubular body.

3. A pen nib as recited in claim 2 and wherein said grooves have in the region of said open end of said body portions wider than portions of said grooves in the regions of said openings, respectively, and said wider groove portions tapering toward said portions which extend to said openings for providing for said side arms an extent of turning movement sufficient to displace said transverse arm beyond the path of movement of said weight out of said tubular body when it is desired to remove said weight and said capillary wire therewith out of said tubular body.

4. A pen nib adapted to be removably mounted in a pen holder and comprising an elongated tubular body having an open end and an opposed end provided with an end wall formed with an axial bore through which the interior of said body can communicate with the exterior, an elongated tubular fitting carried by said body in said bore of said end wall thereof, an elongated capillary wire slidable in said tubular fitting and extending therefrom into the interior of said tubular body, an elongated weight situated in said tubular body and freely movable therein along the axis thereof, said weight being fixedly connected with said capillary wire so that the latter moves with said weight, and guard means carried by said tubular body at said open end thereof for guarding against falling of said weight out of said tubular body, said guard means being of a U-shaped configuration and having a pair of opposed side arms extending from said tubular body at said open end thereof and turnably connected with said tubular body, and a transverse arm extending between and connected to said side arms distant from said tubular body, said guard means having an operating position situated in a plane which includes the axis of said tubular body and locating said transverse arm in the path of movement of said weight to prevent falling of the latter out of said tubular body, said tubular body being formed in its interior with a pair of relatively narrow axially extending groove portions receiving said side arms and with wider groove portions extending laterally beyond said narrow groove portions and communicating therewith to receive said side arms as the latter are pressed slightly one toward the other to enable tilting of said guard means to a position permitting removal of said weight from said body together with said capillary wire.

References Cited by the Examiner

UNITED STATES PATENTS

| | | | |
|---|---|---|---|
| 38,902 | 6/1863 | Lawson | 220—95 X |
| 979,606 | 12/1910 | Ullrich | 120—44 |
| 1,425,150 | 8/1922 | Ullrich | 120—44 |
| 2,175,058 | 10/1939 | Knapp | 229—93 |
| 2,189,696 | 2/1940 | Andrews | 120—44 |
| 2,217,502 | 10/1940 | Wallace | 120—44 |
| 2,711,337 | 6/1955 | Keenan | 220—95 X |
| 3,020,884 | 2/1962 | Riepe et al. | 120—44 |
| 3,055,341 | 9/1962 | Riepe et al. | 120—44 |

FOREIGN PATENTS 923,715   2/1955   Germany.

LAWRENCE CHARLES, *Primary Examiner.*